United States Patent
Meidar et al.

(10) Patent No.: US 11,941,581 B2
(45) Date of Patent: *Mar. 26, 2024

(54) SYSTEM AND METHOD FOR CLASSIFIER TRAINING AND RETRIEVAL FROM CLASSIFIER DATABASE FOR LARGE SCALE PRODUCT IDENTIFICATION

(71) Applicant: TRACXPOINT LLC., Coral Gables, FL (US)

(72) Inventors: Moshe Meidar, Florida, FL (US); Gidon Moshkovitz, Haifa (IL); Edi Bahous, Haifa (IL); Itai Winkler, Haifa (IL)

(73) Assignee: TRACXPOINT LLC., Coral Gables, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/667,590

(22) Filed: Feb. 9, 2022

(65) Prior Publication Data

US 2022/0165046 A1 May 26, 2022

Related U.S. Application Data

(63) Continuation of application No. 17/267,839, filed as application No. PCT/IL2019/051390 on Dec. 19, 2019, now Pat. No. 11,386,639.

(Continued)

(51) Int. Cl.
| | | |
|---|---|---|
| *G06K 9/32* | (2006.01) | |
| *B62B 3/14* | (2006.01) | |
| *G06F 18/22* | (2023.01) | |
| *G06F 18/23213* | (2023.01) | |
| *G06F 18/2413* | (2023.01) | |

(Continued)

(52) U.S. Cl.
CPC ............. *G06Q 10/087* (2013.01); *B62B 3/14* (2013.01); *G06F 18/22* (2023.01); *G06F 18/23213* (2023.01); *G06F 18/24147* (2023.01); *G06N 3/02* (2013.01); *G06N 3/04* (2013.01); *G06V 10/87* (2022.01); *G06V 20/20* (2022.01);

(Continued)

(58) Field of Classification Search
CPC ............. G06K 9/3241; G06K 9/00671; G06K 9/6215; G06K 9/6223; G06K 9/6276; G06K 2209/25; B62B 3/14; G06N 3/02; G06N 3/04

See application file for complete search history.

(56) References Cited

U.S. PATENT DOCUMENTS

2016/0140157 A1* 5/2016 Li .............................. G06T 7/90
707/748

FOREIGN PATENT DOCUMENTS

WO WO 2017/146595 * 8/2017 ............... G06K 9/46

* cited by examiner

*Primary Examiner* — David F Dunphy
(74) *Attorney, Agent, or Firm* — The IP Law Firm of Guy Levi, LLC

(57) ABSTRACT

The disclosure relates to systems and methods for real-time detection of a very large number of items in a given constrained volume. Specifically, the disclosure relates to systems and methods for retrieving an optimized set of classifiers from a self-updating classifiers' database, configured to selectively and specifically identify products inserted into a cart in real time, from a database comprising a large number of stock-keeping items, whereby the inserted items' captured images serve simultaneously as training dataset, validation dataset and test dataset for the recognition/identification/re-identification of the product.

11 Claims, 5 Drawing Sheets

Related U.S. Application Data

(60) Provisional application No. 62/782,377, filed on Dec. 20, 2018.

(51) Int. Cl.
*G06K 9/00* (2022.01)
*G06K 9/62* (2022.01)
*G06N 3/02* (2006.01)
*G06N 3/04* (2023.01)
*G06Q 10/087* (2023.01)
*G06V 10/70* (2022.01)
*G06V 20/20* (2022.01)
*G06V 20/52* (2022.01)
*G06V 30/194* (2022.01)

(52) U.S. Cl.
CPC ............ *G06V 20/52* (2022.01); *G06V 30/194* (2022.01); *G06V 2201/09* (2022.01)

SYSTEM AND METHOD FOR CLASSIFIER TRAINING AND RETRIEVAL FROM CLASSIFIER DATABASE FOR LARGE SCALE PRODUCT IDENTIFICATION

CROSS REFERENCE TO RELATED APPLICATIONS

This patent application is a Continuation of U.S. application Ser. No. 17/267,839, filed Feb. 11, 2021, which is the National Phase filing of commonly owned and now PCT Application No. PCT/IL2019/061390, filed Dec. 19, 2019, claiming priority from U.S. Provisional Patent Application No. 62/782,377, filed Dec. 20, 2018, all which are incorporated herein by reference in their entirety.

COPYRIGHT NOTICE

A portion of the disclosure herein below contains material that is subject to copyright protection. The copyright owner has no objection to the reproduction by anyone of the patent document or the patent disclosure as it appears in the Patent and Trademark Office patent files or records, but otherwise reserves all copyright rights whatsoever.

BACKGROUND

The disclosure is directed to systems and methods for real-time detection of items in a given constrained volume. Specifically, the disclosure relates to systems and methods of classifier assignment and retrieval from database for large-scale product detection.

The Artificial Intelligent Cart (AIC) is configured to automatically identify, in substantially real-time, inserted physical products-out of a significantly large number of different available products (stock keeping items) the inventory of a store and/or a warehouse. The AIC can comprise a plurality of imaging sensors and at least one load cell that are utilized for product recognition. To date, there is no available technology that can deal with the huge numbers of products typically available within a single retailer's or wholesaler's storeroom or shelves. Current state-of-the-art technologies, such as large-scale deep neural networks provide insufficient recognition accuracy when the number of products that are expected to be recognized is increased substantially.

This limitation, which stems in part from lack of sufficient classifiers to successfully recognize the large numbers of products (i.e. classes), is known as the classifier-capacity problem where the increase in the number of items used for training leads to increased error in the test dataset. Another challenge is that the product recognition task is typically a 'fine-grained recognition' (in other words, distinguishing large number species in a genus), since products may have almost identical wrap/box besides a small graphic element distinguishing between them (e.g., weight, % fat, ageing time, etc.).

Both challenges—classifier capacity and fine-grained recognition are still areas of active research. These and other shortcoming of the current state of affairs is addressed in the following description.

SUMMARY

Upon product insertion to the AIC, a set of computer-based algorithms need to be applied in order to correctly identify the inserted product among thousands of products available in a typical retail store, such as a supermarket. Even with current state-of-the-art technologies, such as deep neural networks and especially convolutional-neural-networks (CNN), the achievable accuracy is limited when using a single classifier to classify the thousands of products in a single retail store. This limitation of classifiers to successfully recognize large numbers of products is known in literature as the 'classifier-capacity problem'. Another challenge in large scale product recognition, is that a large number of products may have almost identical wrap/box besides a small graphic element distinguishing between them. This is typical for product-series. Capturing such small differences among different classes is known in literature as 'fine-grained' recognition. Both challenges can be resolved by the characteristic-based classifier training and retrieval method described here.

Accordingly and in an exemplary implementation, provided herein is a system for automated product identification in a shopping cart, comprising: a cart having a front wall, a rear wall and two side walls forming an apically open container with a base; a load cell module operably coupled to the base of the cart; a plurality of imaging modules coupled to the cart, adapted to identify, at least one of image an item inserted into the cart, and image an area of interest outside the cart; a central processing module in communication with the load cell and the plurality of imaging modules, the central processing module comprising a processor and being in further communication with a non-volatile memory having thereon: a classifiers' database; a product characteristics database; and a processor readable media comprising a set of executable instruction, configured, when executed to cause the processor to retrieve a set of a plurality of classifiers, wherein each set of classifiers is configured to identify a single product inserted into the cart.

In another exemplary implementation, provided herein is a method of recognizing and selectively and specifically identifying a product among a vast plurality of products, implemented in a system comprising: a cart having a front wall, a rear wall and two side walls forming an apically open container with a base; a load cell module operably coupled to the base of the cart; a plurality of imaging modules coupled to the cart, adapted to identify, at least one of image an item inserted into the cart, and image an area of interest outside the cart; a central processing module in communication with the load cell and the plurality of imaging modules, the central processing module comprising a processor and being in further communication with a non-volatile memory having thereon: a classifiers' database; a product characteristics database; and a processor readable media comprising a set of executable instruction, configured, when executed to cause the processor to retrieve a set of a plurality of classifiers, wherein each set of classifiers is configured to identify a single product inserted into the cart, the method comprising: inserting an item into the cart; using the imaging module, capturing an image of the inserted item; extracting predetermined number of features (characteristics) from the captured image; retrieving a set of classifiers associated with at least some of the extracted features from the classifier database, wherein the set of classifier is associated with a previously identified product.

BRIEF DESCRIPTION OF THE DRAWINGS

For a better understanding of the systems and methods of classifier assignment and retrieval from database for large-scale product detection, with regard to the embodiments thereof, reference is made to the accompanying examples and figures, in which:

FIG. 1A—Illustrates the characteristic extraction from AIC images, also showing the inference steps in the AIC, provided for illustrative purposes while

DETAILED DESCRIPTION

Figure 1A:
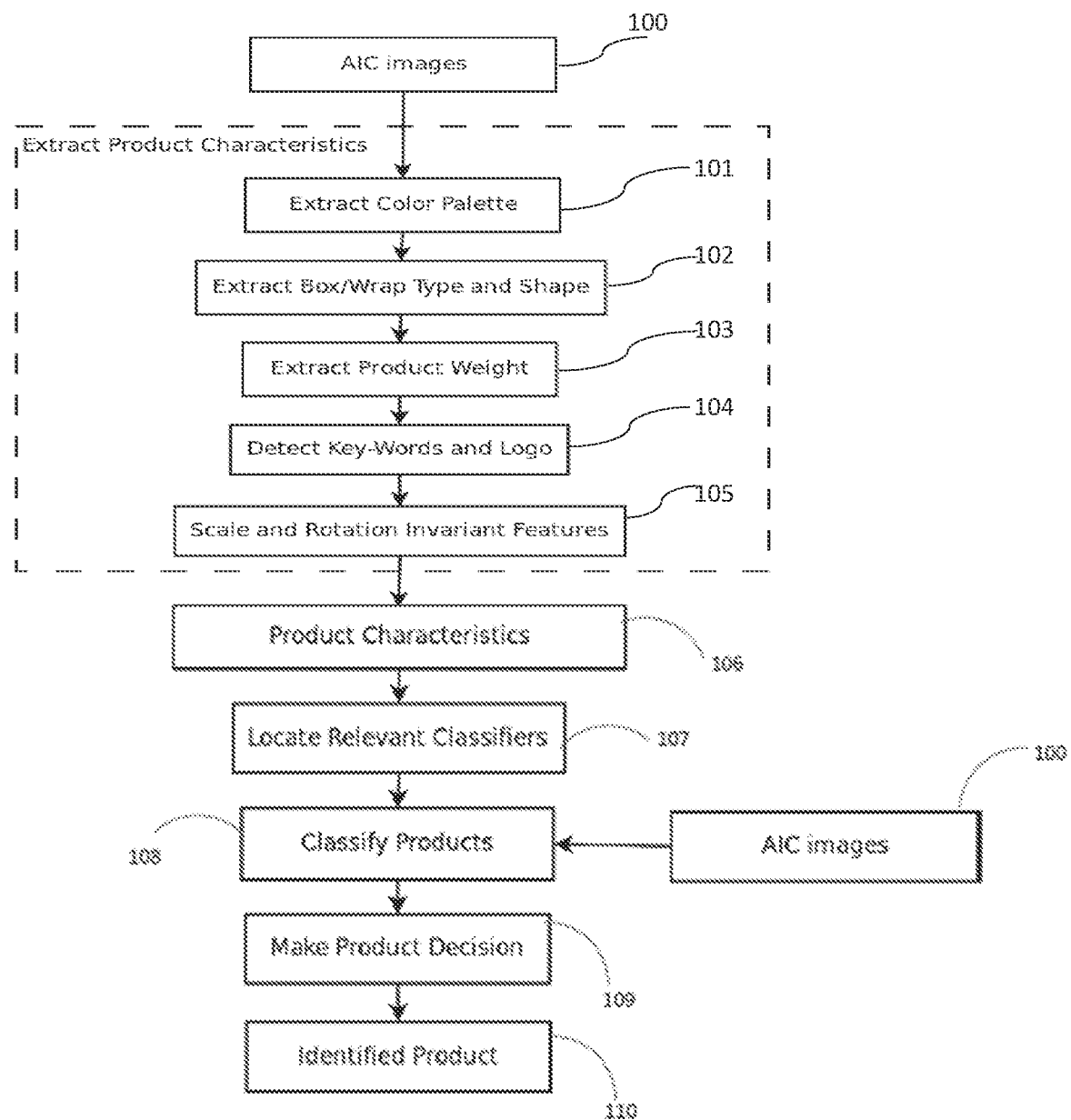

The disclosure provides embodiments of systems and methods of classifier determination, assignment and retrieval from database for fine-grained, large-number—product detection.

In order to address the above-identified challenges, the product recognition task is split among multiple classifiers—each classifier is trained to recognize a small portion of products sharing similar characteristics. Upon product insertion to the AIC, the product characteristics are extracted and identified by the AIC. The extracted product characteristics are then utilized to extract a set of relevant classifiers that are needed to produce a single correct recognition. The relevant classifiers are retrieved from a large classifier database that is typically created to cover the entire available products of a retail store or chain of stores. By using such product-characteristics based classifier retrieval method described here, the number of products that the AIC can recognize is substantially increased and the total detection accuracy is substantially improved.

In order to achieve high recognition accuracies for large number of products, (e.g. Costco (US~4,000 SKUs), BJ's (US~7,200 SKUs), Sam's Club (US~6500 SKUs) multiple classifiers are utilized for each product recognition. There may be one or more classifiers needed for a single recognition and a specific product may be recognized by a single or multiple classifier. The different classifiers in the classifier database are trained on products sharing similar characteristics. For each inserted product, a set of relevant classifiers are selected from the classifier-database.

The retrieved classifiers are then utilized to recognize the inserted products. The classifier retrieval method is based on extraction of product characteristics from a set of cameras and sensors on the AIC cart. The set of extracted characteristics are used as keys to retrieve a set of relevant classifiers from the database.

In the field of data-structures, there are multiple common methods to retrieve data from large databases but none of them couple product characteristics to classifiers or other recognition models as disclosed herein. A notable example of such data-structures and retrieval methods includes using various tree-based data-structures such as a 'k-d tree', allowing fast search and nearest neighbor approximation. Once the set of product characteristics are extracted and used for classifier retrieval, it is expected that the retrieved classifiers were trained on products that share similar characteristics to those of the inserted product, and therefore are tuned to differentiate between similar products.

Product characteristics can be, for example:
a. box/wrap colors
b. box/wrap shape (e.g. box, bottle, jar)
c. Box/wrap size and weight.
d. Key-words located on the box/wrap (e.g. 'popcorn', 'cookies', etc.)
e. Brand/product logos, and other graphic elements in a specific brand/product.
f. Scale and rotation invariant features (e.g. ORB, BRIEF, KAZE)
g. Features obtained from a pre-trained neural networks, such as 'deep features'

An example for pseudocode that can be employed which incorporates a number of the characteristics of the product is presented below:

AIC Classifier Pseudo-Code

```
Inputs:
        Product images {images}_i
Product weight [gr], and product weights database 'weightDB'
Logo detection CNN (Convolutional Neural Network) -
        'LogoNet'
Shape detection CNN - 'ShapeNet'
Text detection CNN - 'TextDetectorNer'
Text recognition network (OCR) - 'OCRNet'
Word embedding network - 'Word2VecNet'
Nearest neighbor retrieval thresholds for each characteristic - 'THRES_<name>'
Outputs: A single product decision.
For each image[i] in {images}_i
{
        prod_hist = ObtainHistogram(image)
        prod_color_points = ProduceColorPoints(image)
        prod_logo = ExtractProductLogo(image, LogoNet)
        prod_shape = ExtractProductShape(image, ShapeNet)
        prod_words = ExtractWordsFromImage(iinage, TextDetectorNet,    OCRNet)
        # Convert words vector to numerical presentation
        words_vec = ProduceWordEmbedding(prod_words, Word2VecNet)
        # Retrieve classifiers by weight
        classifier_list0 = FindNearestNeighbors(prod_weight, weigthDB,
                                THRES_weight)
        # Retrieve classifiers by color histogram
        classifier_list1 = FindNearestNeighbors(prod_hist, pVPtree_EMD, THRES_EMD)
        # Retrieve classifiers by color points
        classifier_1ist2 = FindNearestNeighbors(prod_color_points,
                                pVPtree_Hausdorff, THRES_COLOR)
        # Retrieve classifiers by product logos
        classifier_list3 = FindNearestNeighbors(prodiogo, pVPtreeLogo,
                                THRES_LOGO)
        # Retrieve classifiers by product's shape
```

```
        classifier_list4 = FindNearestNeighbors(prod_shape, pVPtree_shape,
                        THRES_SHAPE)
        # Retrieve classifiers by product's key_words
        classifier_list5 = FindNearestNeighbors(words_vec, pVPtree_words,
                        THRES_WORDS)
        # Intersect classifiers to a smaller set
        classifier_set[i] = Intersect(classifier_list0, classifier_list1,    classifier_list2,
        classifier_list3, classifier_list4,            classifier_list5)
}
# Apply images to the selected classifiers from previous step
For each image[i] in {images}_i {
        For each classifier[k] in classifier_set[i]{
                class_ind[i][k],confidence[i][k] = Classify(image[i], classifier[k])
# Merge classifications to a single product identification
identified_prod = MakeProductDecision(class_ind, confidences)
```

One of the most notable characteristics is the product's wrap colors. By extracting the color-palette of an inserted product, it may be used as a set of keys for retrieving classifiers that were trained on products that exhibit a similar color-palette.

A typical method to represent a product color-palette may be a color Histogram applied to an image or a partial image of the product. The color histogram may be applied to RGB images or interchangeably to other known color-space representations such as hue saturation value (HSV), CIE-LAB, CIE-XYZ, CIE-LCH, and YCbCr to produce such histogram of a product image. The image can undergo a preprocessing step to reduce the number of colors by aggregating similar colors by one of the methods for color-quantization such as K-means, minmax, fuzzy c-means, balanced iterative reducing and clustering using hierarchies (BIRCH), median-cut, center-cut, rwm-cut, octree, variance-based, binary splitting, greedy orthogonal bipartitioning, optimal principal multi-level quantizer, and the like or their combination. Another option to reduce the presentation size of a color palette is the use of wider histogram bins and/or self-organizing maps.

In an exemplary implementation, and in order to achieve high degree of specificity and selectivity in classifying and recognizing (and/or re-recognizing) the product, the color quantization (in other words, reduction, or averaging) is image-dependent whereby a custom (adaptive) palette is determined based on the color distribution of the image.

An example of a pseudocode for performing K-means quantization is as follows:

```
input: X = {x_1, x_2, ..., x_N} ∈ ℝ^D (N × D input data set)
output: C = {c_1, c_2, ..., c_K} ∈ ℝ^D (K cluster centers)
Select a random subset C of X as the initial set of cluster centers;
while termination criterion is not met do
| for (i = 1; i ≤ N; i = i + 1) do
| | Assign x_i to the nearest cluster;
```

$$m[i] = \underset{k \in \{1,2,...,K\}}{\operatorname{argmin}} \| x_i - c_k \|^2;$$

```
| end
| Recalculate the cluster centers;
| for (k = 1; k ≤ K; k = k + 1) do
| | Cluster S_k contains the set of points x_i that are nearest to the center c_k;
| | S_k = {x_i | m[i] = k};
| | Calculate the new center c_k as the mean of the points that belong to S_k;
```

$$c_k = \frac{1}{|S_k|} \sum_{x_i \in S_k} x_i;$$

```
| end
end
```

Other preprocessing steps may also include steps to filter background information that may interfere with the extraction of the product's color palette (i.e. background subtraction), reduce artifacts such as reflections and shadows, image denoising, apply contrast enhancements, and other common image processing techniques intended for image improvement thereby improving the accuracy (in other words, the specificity and selectivity), of the characteristics' extraction. Another possible presentation of product's colors is as a form of point-cloud where each color in the palette is presented as a point in the 3D color-space. This presentation lacks the color-occurrence-rate as in color histograms but may represent the existence of the product colors.

There are several metrics that may be used with color histograms for re-identification purposes. These can be, for example the Earth Movers Distance (EMD) also known as the Wasserstein-Distance, an accurate metric since, being a cross-bin distance, it is robust to color shifts due to lighting and changes in image-acquisition conditions (e.g., focal length. -. Another example of cross bin distance measure that can be used to reidentify captured color histogram can be, for example, Mahalanobis, measuring the distance between an observed point and a distribution. Other metrics can be the Kullback-Leibler (KL)-Divergence, Bhattacharyya distance, and Chi-square ($X^2$) distance (all bin-to-bin distance metrics).

For color palette presented as color cloud, a suitable distance is the Hausdorff distance. This is a measure for similarity between two points clouds. Hausdorff provides accurate similarity between a query image typically exhibiting a single or few facets of the product's wrap/box (packaging) and the product's color-cloud based presentations that should include all facets of the product wrap/box.

The products box/wrap shape designator (referring to a string, number or any other means that can be used to designate an extracted feature), is another characteristic that may be used for classifier retrieval. The box/wrap (packaging) shape may be extracted by various computer-vision based techniques. Such techniques typically include feature extraction of the product boundaries by processing edges presented in the images and extracting edge features. For example, the shape may be presented by extracting contours of the product, or by estimation applied to the products silhouette.

Other suitable methods utilize histogram of oriented gradients (HOG) descriptors features and deep-neural-networks (DNN) for shape extraction. Examples of shape parameters that can be used alone, or in combination as classifier(s) in the shape-based image retrieval can be at least one of Center of gravity, Axis of least inertia, Digital bending energy, Eccentricity, Circularity ratio, Elliptic variance, Rectangularity, Convexity, Solidity, Euler number, Profiles, Hole area ratio, and the like. In other circumstances, it may be possible to associate and retrieve relevant classifiers based on product's wrap/box shape or shape descriptor, captured as, for example—a key word on the wrap/box/package. When the shape or shape-descriptor is embedded in some space on the package, and the shapes descriptors are semantically-related (e.g., a "Jar" is "closer" to a "bottle" than to a paper box, while "cup" and "bowl" may be closer than "bowl" and "can"). This relatedness can be used in certain embodiment, to increase the selectivity and specificity of the classification and re-identification.

The product's weight and physical dimensions are other product characteristics that are used as a key-word for classifier retrieval. Weight is achieved by a load cell module (referring to any device that detects a physical force such as the weight of a load and generates a corresponding electrical signal). The product physical size (i.e. physical dimensions) can be estimated based on the use of a plurality of imaging modules with a given and known location (in other words, pose), with respect to the product. Another option for size detection is by utilizing—imaging modules such as RGB-D where the typical RGB color information is accompanied by depth information. The size and weight combination may be used to differentiate the same products that only differ in box size and products that are sold in variable batch sizes, such as some dairy products and fruits—thus providing the required level of granularity. In configurations using RGBD the shape of the product can also be extracted by utilizing the depth information from the RGBD camera.

Products logos and trademarks are both examples of characteristics that can be used for classifier retrieval. A given product can exhibit multiple logos and trademarks on its package. For example, a products box/wrap can exhibit the company/producer logo, a products series logo (if the products is a part of a series), the specific products logo, along with other logos and trademarks. The products logos are extracted by various techniques. Notable techniques utilize image descriptors such as HOG, oriented FAST rotated BRIEF (ORB), KAZE, that are used to produce local image description, allowing the detection of specific logo-pattern in a given product image.

Other approaches can be utilizing deep neural networks for logo detection and localization in an image. Example for such networks include single-shot MultiBox detector (SSD), Regional convolutional neural network (RCNN), Fast-RCNN, Faster-RCNN, you only look once (YOLO), that were trained to detect and locate desired logos. The available logos are stored in the logo database where they are associated with a numeric value allowing their retrieval. When a products exhibits multiple logos, all logos for that product may be extracted and used to characterize the relevant classifiers.

Specific key-words on the product may be used as key-words for classifier retrieval. If a specific key word can be identified in a product image, it may be used as a key to access the relevant classifiers in the classifiers database. For example, the word 'Apple' may appear on various products containing apples as one of their ingredients. There are number of methods to detect text in images and to recognize the words through optical character recognition (OCR). In an exemplary implementation, DNN's are used for both text-localization and recognition in a given image.

Typically, the quality of the detected text (i.e. a confidence measure) may be provided, allowing to use words that were detected and recognized with high confidence. Examples for text detection in natural images are EAST, PSENet, FOTS, Text-Snakes for text detection. Examples of a text recognition algorithms include ASTER and ESIR. Products typically exhibit an abundance of words on their box/wrap. Some are not useful for the classifier retrieval task. As an example of such words are those presented in nutritional values table (e.g. carbohydrates, fat etc. . . . ). The system can be configured to filter out such words that have a too common appearance and discards them when they are processed for producing keys for classifier retrieval.

Another type of product characteristics can be provided from a Neural networks such as Deep Neural Network (DNN). A specific example for this can be utilizing a Convolutional Neural Network (CNN), such as Inception, Xception or any other, to extract image related features. In literature, such features produced by a DNN are termed 'Deep Features'. Such 'Deep Features' can be extracted a single or multiple network layers. Combining deep features from multiple DNN's is also an option to improve the sensitivity and specificity for a given product. The extracted 'Deep Features' are used as an image descriptor to characterize a product and to provide probable-candidates for the product and direct the retrieval of relevant classifiers.

In addition, for each site (store, warehouse, etc.), the extracted text, key-words and OCR-retrieved texts can be further used to develop a site-specific ontology, which can then be used to assign relatedness metric. That metric can then be used in associating and retrieving relevant classifiers when the classifiers are retrieved by matching, and/or mapping representative words of the inserted products, extracted by the imaging module, to representative words associated to the classifiers in the classifiers database.

After the set of product characteristics was formed it is used to produce keys for classifiers retrieval. The classifiers can be selected by a nearest-neighbors (NN) or approximated nearest neighbors (ANN) algorithm. There are multiple variants that can be considered for classifier selection form the database. One is to apply NN or ANN to each type of product characteristics separately and intersecting the results to obtain a smaller set that is more appropriate for on-line processing. As an example, for a product exhibiting a color palette of red and blue colors, weighing 550 [gr], in a bottle-shaped case and with an identified key-word 'beer', each of those characteristics is used separately to retrieve relevant models—The color palette is used to retrieve classifiers that were trained on products with similar blue and red color pallets, the bottle shape is used to retrieve a set of classifiers that were trained on various bottles' shapes. The key word—'beer' will be used to filter products that exhibit the same key-word 'beer' on their package. Moreover, using hash functions, it is possible to both classify and rapidly retrieve text strings such as "light beer".

Intersecting (in other words, overlapping in the classifier selected using NN and ANN independently), the classifiers retrieved based on each characteristic will result a small set of classifiers which can identify the product with higher accuracy despite having thousands of products available in the product database.

$$\{C\}=\{C(\text{Color})\}\cap\{C(\text{Weight})\}\cap\{C(\text{OCR})\}\cap\{C(\text{Shape})\}\cap\{C(\text{ORB})\}\cap\{C(\text{Deep})\}$$

Formula 1: Combining Classifiers by Characteristics

The formula above formulates this approach. For example, the formula is presented with 6 different characteristics intersected (in other words, selected by both NN and ANN). However, the described approach may be extended to include other characteristics (e.g., key word, graphics, and the like), by adding additional elements as additional intersections in the formula.

Other variations of the formula utilizing one or more of the characteristics for classifier retrieval and selection can be interchangeably used without altering the scope described and claimed herein. In similarity-based retrieval, the various characteristics can be presented numerically. The conversion to a numeric presentation can be made in a straight-forward fashion for hierarchical characteristics that have numerical values by nature, such as weight, volume, and color or color-histogram. Other characteristics, for example, categorical characteristics may need to be converted to a numeric presentation prior to using them in a classifier search and retrieval method.

Text-based key words extracted by OCR are converted in an exemplary implementation to numeric presentation. Various methods can be used to represent words as numeric vector (a.k.a word embedding). For example, embedding words into dense vectors (where each word is represented by a dense vector, a point in a vector space, such that the dimension of the semantic representation d is usually much smaller than the size of the vocabulary ($d<<V$, the vocabulary size), and all dimensions contain real-valued numbers, which can be normalized between −1 and 1) and others to sparse presentations. Additional methods can use neural networks for this embedding (where word is represented by a one-hot representation, a unique symbolic ID, such that the dimension of the symbolic representation for each word is equal to the size of the vocabulary V (number of words belonging to the reference text), where all but one dimension are equal to zero, and one dimension is set to be equal to one. An example is 'Jaccard distance' (measure the fraction of words any two sets have in common) can be used to compare lists of key-words. Other similarity metrics, such as, for example Cosine similarity, Spearman's rank correlation coefficient, or Pearson $X^2$ (Chi-square) test-based $X^2$ distance may be used additionally or alternatively. Another option for words is to use the character string as hashing keys to retrieve relevant classifiers who match a word or a set of words (for example "gluten free").

Shape of product may also be encoded to a numeric set of values. Accordingly, the semantic relation between different box/wrap shapes may be defined. The semantic relation between various shapes is needed since shape appearance may also be dependent on the imaging direction. For example, a circular shaped product packaging may be perceived as either a bottle or a jar, depending on the direction of image capturing. Since the number of available box/wrap/package shapes' is typically smaller, the shape similarity or relatedness may be produced by manually defining similarity between various wrap/box (packaging) shapes. For example, a cylindrical-shaped bottle will be similar to ajar and to an oval-shaped bottle. The similarity or distance may be stored as an adjacency matrix. But other presentations are applicable as well.

Scale and rotation invariant descriptors can be used in an exemplary implementation to extract local information from the product image. These include, for example at least one of: BRIEF, BRISK, FREAK, HOG, ORB and KAZE. These descriptors characterize image information around key-points (e.g., features) extracted from the image captured by the imaging module. Key points are typically prominent points, for example, corners, and can be extracted by various methods such as Harris corner detection, SUSAN, Laplacian of Gaussian (LoG), FAST. The descriptor (e.g., BRIEF, BRISK, FREAK, HOG, ORB and KAZE) can be configured to extract and store information from an area around each key point. The descriptors may also be used as a local pattern-detector allowing to search for similar patterns in other images. Here, the descriptors may be used as product characteristics for classifier retrieval. The extracted classifier will have to exhibit descriptors that have matches in the query image. In an exemplary implementation, one such descriptor is ORB, which is a binary-descriptor that allows fast matching by using Hamming distance. Using ORB, key-points are determined using features from accelerated segment test (FAST). Then a Harris corner measure (referring to a point whose local neighborhood stands in two dominant and different edge directions), is applied to find top N points. FAST does not compute the orientation and is rotation variant, but rather the intensity weighted centroid of the patch with located corner at center. The direction of the vector from this corner point to centroid gives the orientation.

Moments can be computed to improve the rotation invariance. The Binary Robust Independent Elementary Features' descriptor (BRIEF) typically performs poorly if there is an in-plane rotation. In ORB, a rotation matrix is computed using the orientation of patch and then the BRIEF descriptors are steered according to the computed orientation. Other feature descriptors can be also used interchangeably.

Although each characteristic can be used individually to retrieve relevant classifiers, in certain embodiments, multiple characteristics are used for the retrieval step, thereby improving retrieval accuracy and reducing the retrieved classifier set size considerably. In an exemplary implementation, classifiers are extracted based on multiple product characteristics is by concatenating (in other words, juxtaposing one bit field onto another) all characteristics to a single multi-dimensional vector containing all characteristics extracted from a single image or a product. The vector may be subjected to normalization and/or standardization. Another variant of presentation includes assigning weights to each characteristic—giving certain characteristics higher significance than others.

In another exemplary implementation, each characteristic is used separately to retrieve a larger set of relevant classifiers followed by an intersecting step to select the set of classifiers which match multiple characteristics. Methods for extracting nearest neighbors (NN) or k-Nearest neighbors (kNN) from database can be used. The classifier database can be very large (typically more than 100 k classifiers), which implies that retrieving the appropriate classifiers by comparing each character to the entire database may be time consuming and not appropriate for real-time product recognition as needed in the AIC. Therefore, in an exemplary implementation, approximate-nearest-neighbors (ANN) techniques are used.

In an exemplary implementation, metric-trees (e.g. Ball trees, VP trees) and Locality sensitive hashing (LSH) are used. Other proximity-based search methods may be used interchangeably. The used metric-trees and LSH may also be utilized separately for each characteristic and then the results merged into a set of relevant classifiers as in Formula 1. FIG. 5 illustrates the characteristics vector that is extracted from a query product inserted into the AIC. The classifiers in the classifier data base are also associated with similar presentation. The vector can be a numerical representation of the entire set of characteristics obtained, for example by concatenation of numerical representation of extracted features) and can serve as the basis for the retrieval method described. The two-retrieval methods; vantage point (VP)-tree, and LSH are presented for illustrative purposes.

In certain examples, the models used for creating the classifiers and retrieving the models used to retrieve the classifiers are determined using a preliminary neural network, which is configured to select the appropriate model based on initial product characteristic input obtained from the imaging module and other AIC sensors, as well as the location of the AIC in the 3D space of the store/warehouse. It is further noted, that the preliminary neural network used to select the model(s) or other CNN, RNN, used for classifiers creation (in other words, building the classifier) and/or retrieval, do not necessarily reside on the AIC, but are rather located on a backend management server, configured to communicate with a transceiver in the AIC through a communication network. Therefore, images and other output generated by the AIC's sensor array (e.g., load cell, location sensors, etc.) are transmitted through the (wireless) communication network to the backend management server (BMS), where both classifier creation (building), and classifier retrieval/modification can take place.

The various appearances of "one example," "an exemplary implementation" or "certain circumstances" do not necessarily all refer to the same implementation or operational configuration. Although various features of the invention may be described in the context of a single example or implementation, the features may also be provided separately or in any suitable combination. Conversely, although the invention may be described herein in the context of separate embodiments for clarity, the invention may also be implemented in a single embodiment. Also, reference in the specification to "an exemplary implementation", "some embodiments" or "other embodiments" means that a particular feature, structure, step, operation, application, or characteristic described in connection with the examples is included in at least one implementation, but not necessarily in all. It is understood that the phraseology and terminology employed herein is not to be construed as limiting and are provided as background or examples useful for understanding the invention.

It is noted that the term "imaging module" as used herein means a unit that includes a plurality of built-in image and/or optic sensors and outputs electrical signals, which have been obtained through photoelectric conversion, as an image, while the term "module" refers to software, hardware, for example, a processor, or a combination thereof that is programmed with instructions for carrying an algorithm or method. The modules described herein may communicate through a wired connection, for example, a hard-wired connections, a local area network, or the modules may communicate wirelessly. The imaging module may comprise charge coupled devices (CCDs), a complimentary metal-oxide semiconductor (CMOS), an RGB-D camera, or a combination comprising one or more of the foregoing. If static images are required, the imaging module can comprise a digital frame camera, where the field of view (FOV) can be predetermined by, for example, the camera size and the distance from a point of interest in the cart. The cameras used in the imaging modules of the systems and methods disclosed, can be a digital camera. The term "digital camera" refers in an exemplary implementation to a digital still camera, a digital video recorder that can capture a still image of an object and the like. The digital camera can comprise an image capturing unit or module, a capture controlling module, a processing unit (which can be the same or separate from the central processing module). The systems used herein can be computerized systems further comprising a central processing module; a display module; and a user interface module.

The Display modules, which can include display elements, which may include any type of element which acts as a display. A typical example is a Liquid Crystal Display (LCD). LCD for example, includes a transparent electrode plate arranged on each side of a liquid crystal. There are however, many other forms of displays, for example OLED displays and Bi-stable displays. New display technologies are also being developed constantly. Therefore, the term display should be interpreted widely and should not be associated with a single display technology. Also, the display module may be mounted on a printed circuit board (PCB) of an electronic device, arranged within a protective housing and the display module is protected from damage by a glass or plastic plate arranged over the display element and attached to the housing.

Additionally, "user interface module" broadly refers to any visual, graphical, tactile, audible, sensory, or other means of providing information to and/or receiving information from a user or other entity. For example, a set of instructions which enable presenting a graphical user interface (GUI) on a display module to a user for displaying and changing and or inputting data associated with a data object in data fields. In an exemplary implementation, the user interface module is capable of displaying any data that it reads from the imaging module.

In addition, the term 'module', as used herein, means, but is not limited to, a software or hardware component, such as a Field Programmable Gate-Array (FPGA) or Application-Specific Integrated Circuit (ASIC), which performs certain tasks. A module may advantageously be configured to reside on an addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules.

As indicated, provided herein is a computer program, comprising program code means for carrying out the steps of the methods described herein, implementable in the systems provided, as well as a computer program product (e.g., a micro-controller) comprising program code means stored on a medium that can be read by a computer, such as a hard disk, CD-ROM, DVD, USB, SSD, memory stick, or a storage medium that can be accessed via a data network, such as the Internet or Intranet, when the computer program product is loaded in the main memory of a computer [or micro-controller] and is carried out by the computer [or micro controller]. Memory device as used in the methods, programs and systems described herein can be any of various types of memory devices or storage devices.

The term "memory device" is intended to encompass an installation medium, e.g., a CD-ROM, SSD, or tape device; a computer system memory or random access memory such as DRAM, DDR RAM, SRAM, EDO RAM, Rambus RAM, etc.; or a non-volatile memory such as a magnetic media, e.g., a hard drive, optical storage, or ROM, EPROM, FLASH, SSD, etc. The memory device may comprise other types of memory as well, or combinations thereof. In addition, the memory medium may be located in a first computer in which the programs are executed, and/or may be located in a second different computer [or micro controller] which connects to the first computer over a network, such as the Internet [or, they might be even not connected and information will be transferred using USB]. In the latter instance, the second computer may further provide program instructions to the first computer for execution. The building blocks of this method shall become more perceptible when presented in the drawings of the flowcharts.

FIG. 1A represent the entire classification work flow. After using the product characteristics to extract a set of relevant classifiers, the product images are presented to the classifiers, each providing a classification. The combination of the classifications resulting from multiple classifiers are able to provide fine-grained prediction for the inserted product with high accuracy. The different predictions (or classifications) made from different classifiers are fed into a 'Decision Module' combining predictions to a single most-probable decision for the inserted product. The classifier database is formed by training multiple classifiers on products sharing some or all characteristics. The formed classifiers are associated with these set of characteristics for later retrieval. The product characteristics are stored in the characteristics database in one or more of the data structures mentioned above. The product images which are needed for maintenance of the system are also kept in the products images data base.

Figure 1B:
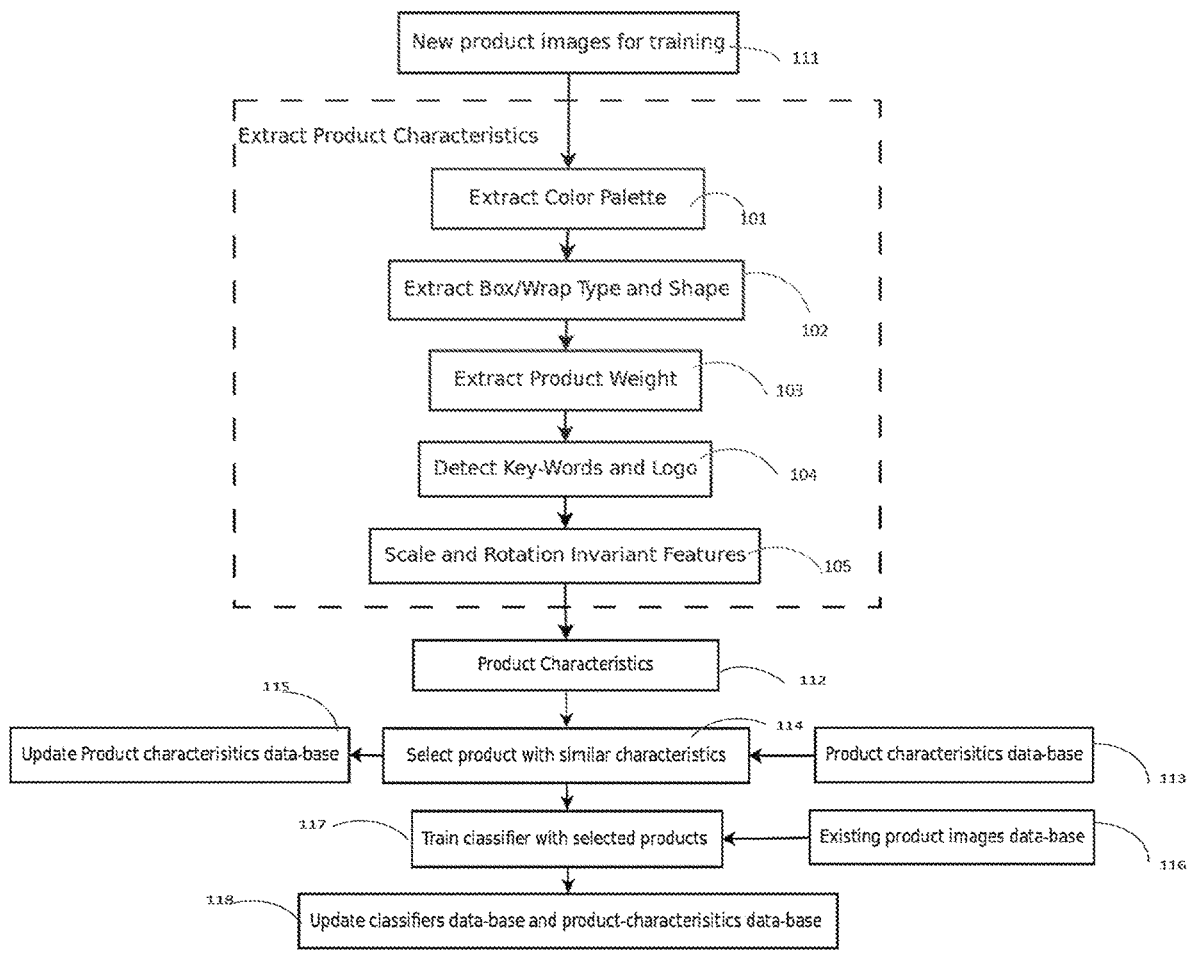
FIG. 1B illustrates a flow diagrams of the characteristics extraction during the training process, including the classifier database update provided for illustrative purposes.

FIG. 1B, illustrates the algorithm flow during classifier training and represents the flow diagram for adding a product into the classifier system. The product characteristics are extracted and added to the characteristics database, followed by model training and model fine tuning needed for inclusion of a product in the system.

Figure 4:
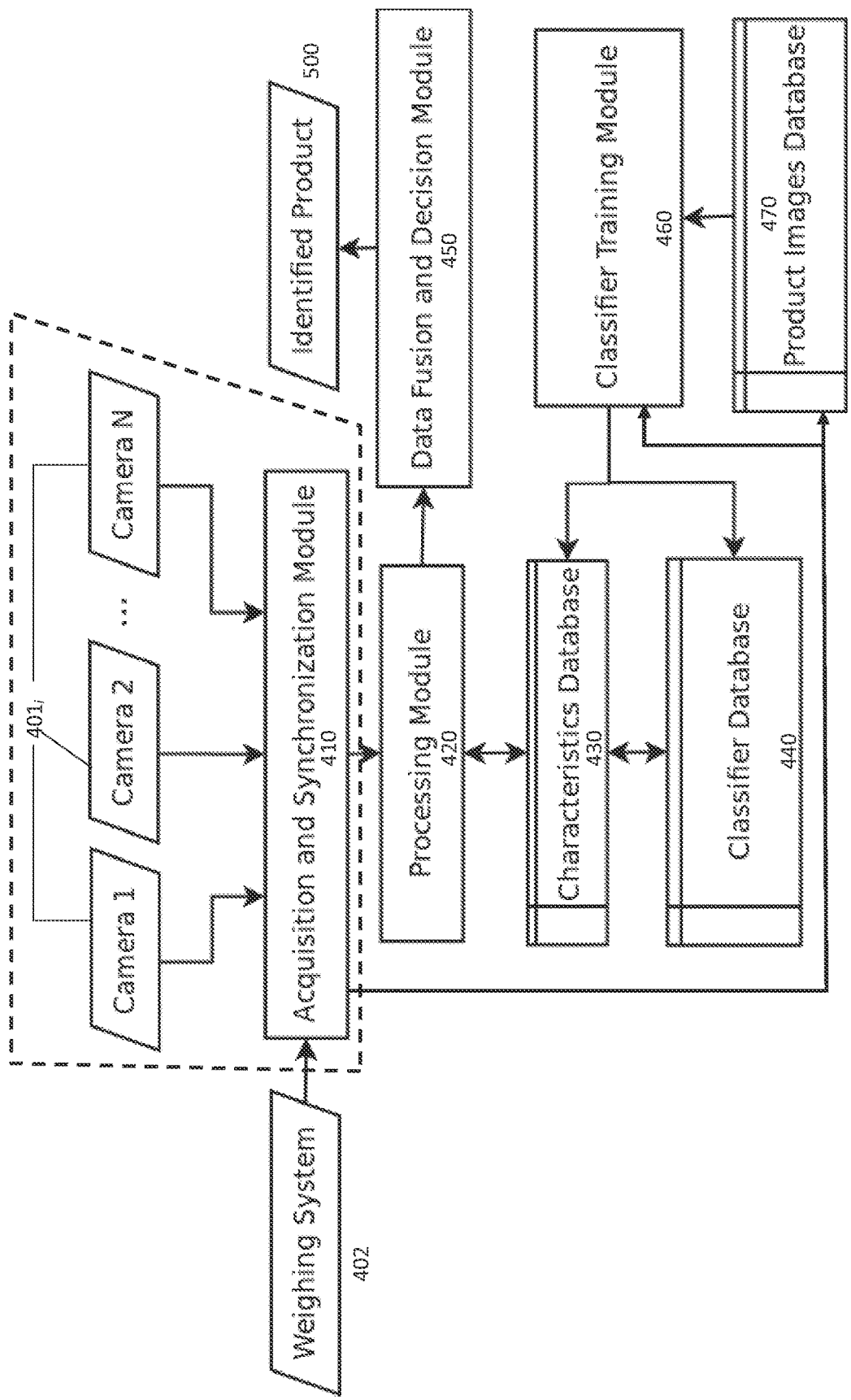
FIG. 4, illustrates a schematic of the system components associated with the execution of the methods.

FIG. 4 illustrate the system components in high level details.

Figure 3:
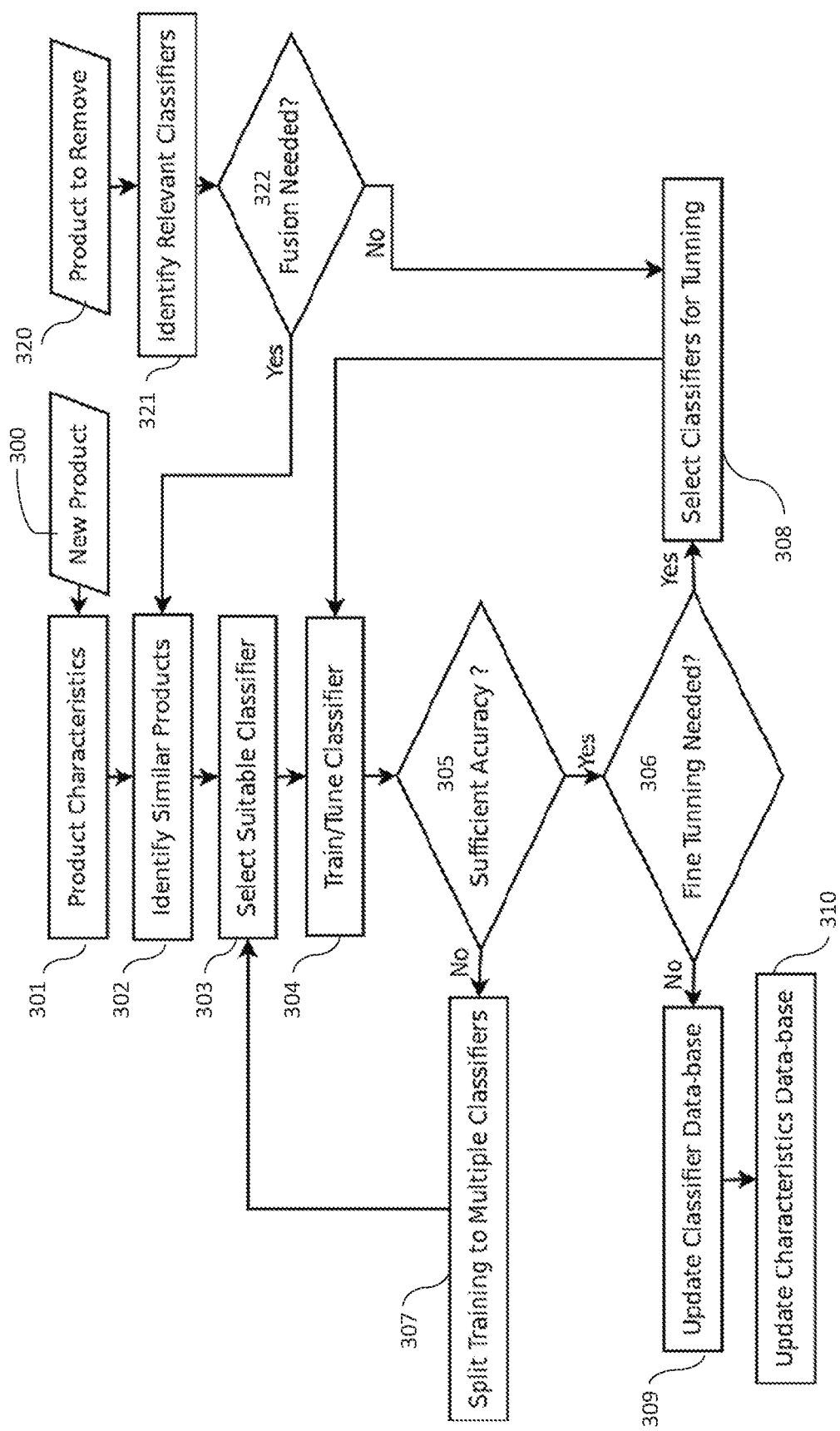
FIG. 3. shows a flow diagram of the classifier training and management when new products are inserted or when a product is removed.

FIG. 3 shows the flow diagram of the process of adding or removing new product into or from the database. When a product needs to be added to the database, its characteristics are extracted and used to identify other products sharing the similar characteristics. The amount of the products in this similarity set is used to determine which classifier is suitable for the classification of this set. The system may also choose to split the set to smaller plurality of sets and train them separately as individual classifiers. This split can lead to some form of classifiers overlapping where the same product may be recognized by different classifiers. This split is needed in order to avoid the classifier capacity limit.

The decision which classifier model to use, is based on the overall obtained accuracy. If the classifier fails to achieve the desired accuracy for its products, it can be split into several classifiers which are trained on smaller set of products, until the desired accuracy is obtained for all participating products. In particular cases, the split can lead to 'binary classifiers' i.e. having two classes in their outputs. In other particular cases, the system may choose, as a result of the training process used with the particular model, to fuse several similar products to be in one class, if this can provide improved accuracy in distinguishing a specific product versus a group of similar products.

The addition of a new product can also affect other classifiers in the classifier database, which now may need to be able to cope with the new product and the changes in the similarity sets, thus requiring a fine tuning of the classifier parameters by applying additional training iterations which will include the new product images as the input. If a product needs to be removed from the database, the classifier(s) that contain this product among their output classes are updated to ignore this product. In one embodiment, the eliminated product class is regarded as 'Don't Care'—the eliminated class is ignored.

Another option to remove a class is to revise the number of outputs (i.e. classes) of the classifiers and fine tune the classifiers parameters by applying additional training (a.k.a. fine tuning). If too many products are removed, resulting some classifiers having too few classes, the system may also decide to fuse two classifiers to a single larger classifier, as long as the accuracy of the new larger classifier is maintained. Similar process can be used for additional product management in the cart, and likewise can be directed to at least one of splitting, and merging products. These processes will ostensibly change the number of classifiers and their magnitude.

For example, certain egg cartons are sold with scored packaging, and can be split. In some embodiments, an outward looking imaging sensor can initially identify certain product characteristic prior to being inserted into the AIC, however, when inserted to the AIC, the user split the package to two or more sub-packages. In these circumstances, the imaging system can extract the new package and create a classifier that is specific to the initial product, indicating it is "splittable" (or, in other words, capable of being retrieved), and a classifier for each of the sub-parts. These classifiers can then be trained to regard the split product independently from the original product, then added to the classifier database, while the initial and sub-product packages images can be added to the images database, as well as to the characteristics' (key/hashing function) database. Creating a classifier (and the classifier database) refers for example to either initially training a classifier, or retraining (modifying) a classifier (e.g., as the result of model/machine learning of a deep feature). The term "classifier" refers, in an exemplary implementation, to either a binary classifier or a multiclass classifier. A binary classifier is a classifier that has two output categories, for example, two products or two characteristics, whereas a multiclass classifier has multiple categorical outputs and is used to classify multiple products or to classify multiple characteristics.

Similarly, products can be merged, forming a new product with its own set of classifiers that are either independent or derivative of the products making the merged product. It is noted that merged product characteristics may be identical to the products making the merged product, except for one or two characteristic (and hence classifier), for example at least one of: weight, volume, and shape factor. Here too, these classifiers can then be added to the classifier database, while the initial and sub-product packages images can be added to the images database, as well as to the characteristics' (key/hashing function) database.

In the current embodiment various types of convolutional neural networks are used (CNN's). To date, CNN's produce superior results to other commonly used classifiers such as SVM's, and Decision trees. The selection of the type of CNN depends on the number of the products (i.e. classes) it is intended to classify. If a set of characteristics are relatively common, i.e. many products share these characteristics, larger types of CNN's can be selected for use (e.g. Inception, Xception, VGG). For less frequent characteristics smaller CNN's may be used without loss of accuracy. Despite using CNN's, this methodology is interchangeably applicable to any type of classifiers.

In addition, the three-dimensional space, namely the warehouse, store, etc., can be further outfitted with locator system, used in an exemplary implementation to establish the relative location of the AIC by transmitting a signal between the AIC and an array of receiving devices having a known location. Providing the location of the AIC can be used by the processing module to limit the classifiers retrieved thus making the identification (and re-identification) more efficient, increasing both the selectivity and specificity of the classifiers, whether in the training stage or in the retrieval stage.

For example, a suitable locator system can be based on "ultrawideband" (UWB) signals, which are short pulses of radiofrequency energy. In a location system using UWB technology, the distances and/or bearings are measured by sending UWB pulses, typically on the order of one nanosecond long, between the AIC and the receiving device. The distance between an object and a receiving device can be calculated by measuring the times-of-flight (TOF) of the UWB pulses between the object and the receiving device. UWB signals are assumed to travel at the speed of light, therefore the distance between the object and the receiving device can be calculated from the time taken by a UWB pulse to travel between them. Other location systems can be those utilizing BlueTooth beacon systems and RFID locator systems.

As indicated previously, an outwardly-sensing optical sensor can likewise be used to narrow the retrieval parameters for the classifiers, both in the training and re-identification stage. In certain embodiments, the 3D space can be outfitted with various markers or fiducials, which can be introduced as a classifier parameter, again, making the training more efficient and increasing the specificity and selectivity of the process. Accordingly and in an exemplary implementation, the AIC further comprises a transceiver in communication with the central processing module, the transceiver adapted to transmit and receive a signal configured to provide location of the cart, for example a UWB signal and the classifier produced initially, and retrieved during re-identification by the processor, is, in addition to other image-extracted features, location based.

FIG. 1A is a flow diagram showing how product images 100 are used for characteristics extraction 101-106 such as color palette 101; box/wrap type & shape 102; weight 103; key-words & logo 104 and scale and rotation invariant features 105 and Deep Feature 106. The deep feature 106 may represent a sub-field of machine learning involving learning of a product characteristic representations provided from a deep-neural-network (DNN) trained to identify that product. A DNN can be used to provide product characteristics by collecting its response to a given input, such as a product's image, from at least one of its layers. The response of a DNN to a product image is hierarchical by nature. The term 'Deep Features' typically corresponds to responses produced by deeper layers of a DNN model. Such 'Deep Features' are typically specific to the input product or to similar products, therefore can be used as a unique descriptors for the product, such descriptors can be used as characteristics for classifier retrieval and re-identification once the product is scanned.

Images 100 may be processed in order to prepare them for classification. Image (pre-)processing may include multiple steps such as: cropping, background subtraction, denoising, lighting adjustment and others. Once a clean image is obtained, the product characteristics are extracted and used for retrieval of relevant classifiers that are needed to obtain an accurate decision on the inserted product.

The product characteristics 107 are used to select relevant classifiers 108 from classifier data-base 440 (see e.g., FIG. 4). The input images 100 or a processed version of the input images 100 are provided to the set of relevant classifiers 108 which produce product classification (inference) 109.

A decision module 450 (see e.g., FIG. 4) collects the classified results 109 from all retrieved classifiers 108 and makes a single decision 110 for the inserted product, thus identifying the product 111.

FIG. 1B shows the process of training a classifier with similar product characteristics. Images of a new product 112 undergo characteristics (feature) extraction 101-106. Characteristics 101-106 are extracted using the original input images 112 (organic images) or a processed version of the input images (synthetic images) creating the product characteristics vector 113. Product characteristics vector 113, from multiple products are used to form the product characteristic data-base 114. The product characteristics are used to identify other products (species) who share similar characteristics 115 and create an updated product characteristic data-base 116. The classifier 118 is trained on images from existing products' database 117 of products which share similar characteristics (genus). The training 118 allows the classifier to distinguish between the similar products (in other words, identify species within the genus). Upon successful training, the new classifier 118 is added to the updated classifier data base 119 and the product-characteristics data-base 116 is updated with the new product characteristics 113.

Figure 2:
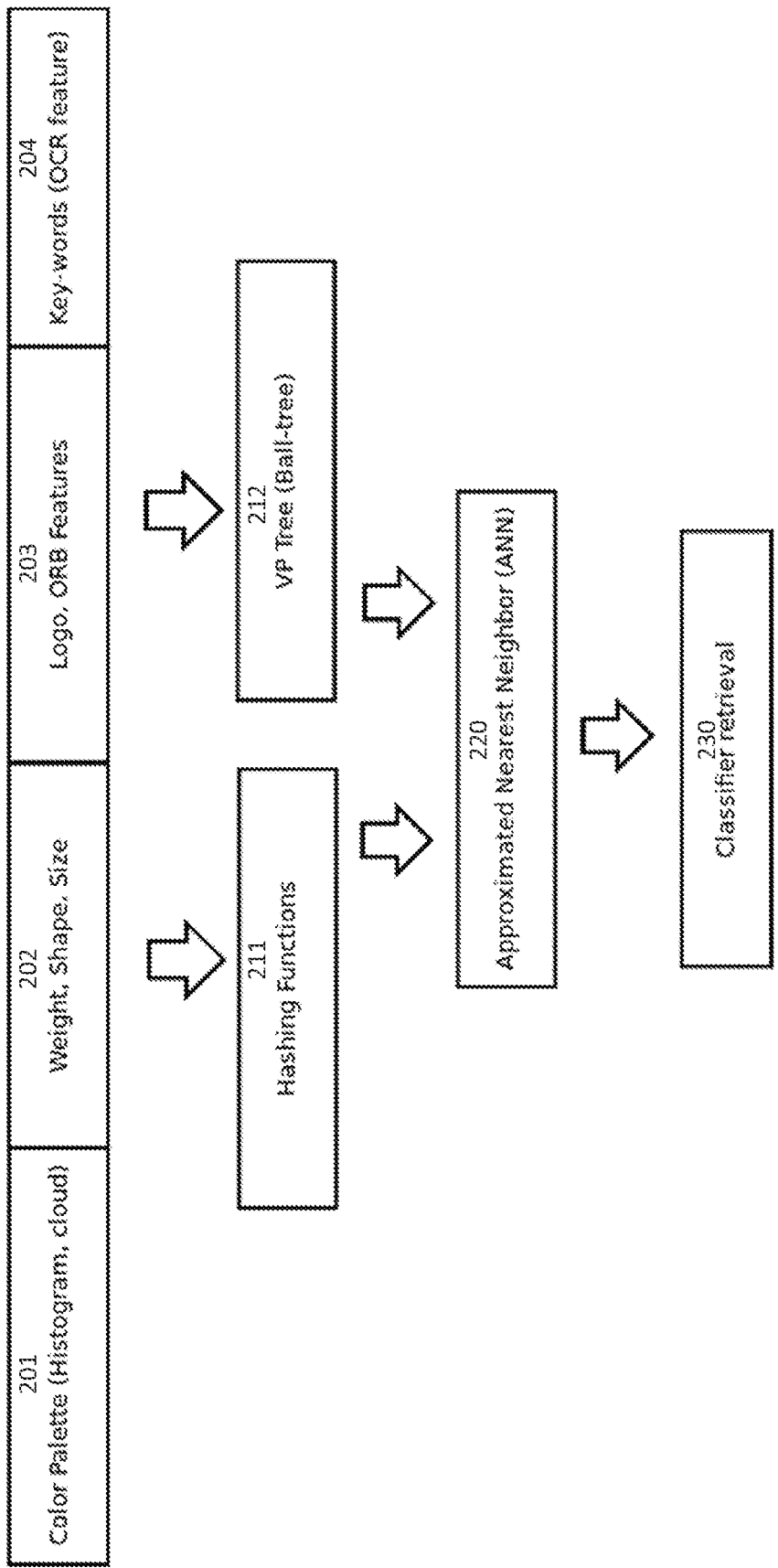
FIG. 2 Illustrates the structure of the unified characteristics vector and its use for classifier retrieval.

FIG. 2 shows an illustration of the characteristics vector and its use for classifier retrieval. The extracted product characteristics 201-205 are provided as a separate numeric vector, or as keys, or concatenated to a single numeric vector presentation. Specialized data structures such as VP tree 212 or other metric/ball trees and/or Hashing functions 211 are used for obtaining an approximated nearest neighbor 220. The neighbors are then used to retrieve the set or relevant classifiers 230 from the classifier database.

FIG. 3 shows the flow diagram for insertion and/or removal of a product from the products database. Upon receiving of images of a new product 300, the product characteristics extraction is applied to obtain a set of product characteristics 301. The product characteristics 301 are utilized to identify products 302 that exhibit similar characteristics. The set of products 302 are used to identify a suitable classifier 303 based on the size and complexity of the selected product set 302. The selected classifier is then trained 304 with images or processed version of the selected product set 302. A validation module 305 test the performance of the new classifier and decides whether the classifier provides the intended accuracy. If the newly-formed classifier fails to achieve the intended accuracy it may lead to a splitting the product set to multiple smaller product sets 307, where then each smaller set will be subjected to classifier selection 303 and training separately 304. If the intended accuracy was achieved the decision module 306 will than decide which classifiers in the database needs to be updated 308. The classifiers will then be provided with additional training images for allowing them to cope with the new product and the new classifiers space partition. When no additional training or fine tuning is needed, the classifier database is updated with the new classifiers 309 and the product-characteristics database is updated 310 with the new product characteristics. Upon selection of a product to be removed from the database 320, the set of classifiers able to identify this product are identified 321. This set of classifiers are then tested 322 if fusing of two or more classifiers is needed. If some or all of the classifiers maintain sufficient amount of products. Thus, no classifier fusion is needed, the selected classifiers 308 are tuned by additional training steps 304 without the images of the removed products. If classifier fusion is desired the system will identify relevant similar products 302 for selection 303 and training 304 of a new classifier on the newly formed dataset. Typically, artificial neural-networks (ANN) produce superior results to other commonly used classifiers such as SVM's, Decision trees. But any classifier may be interchangeably used with this suggested method.

FIG. 4, is a schematic illustrating an exemplary implementation of the various modules used in implementing the methods described herein. As illustrated, plurality of imaging sensors 401$i$ (e.g. RGB-D cameras), some of which are directed toward the inside of the cart (not shown). The plurality of imaging sensors can be configured to capture an image of the product inserted into the cart, thus providing perspective allowing distinguishing both size and shape characteristics of the product, and together with the load cell module 402, present the extracted features to acquisition and synchronization module 410, which can form in certain embodiment, a part of imaging module (dashed trapezoid).

Extracted features are input to a processing module 420, which compares them with characteristics already stored in characteristic database 430 whereupon finding a corresponding characteristic set in characteristics database 430, the set of identified characteristics serves either together as a single concatenated vector or each individually, as a key to retrieve a set of classifiers from classifier database 440. The retrieved classifier, or set of classifiers are then input to data fusion and decision module 450, where a determination is made regarding the confidence level in identifying the product, and if the confidence level is above a predetermined level, the product is identified 500 and optionally displayed on a cart display (not shown).

Images captured by acquisition and synchronization module 410 can be transmitted to product image database 470, and to classifier training module 460, where and discrepancy between retrieved classifiers and product characteristics extracted is identified and based on extracted features, a new classifier is established, and the characteristic associated with the classifier is established as a retrieval key for that particular classifier. The captured image is then stored in product image database 470, and the added classifier and added feature (characteristic) are stored in classifier database 440 and characteristic database 430 respectively. Thus, any image captured by the imaging module serves simultaneously as training, validation and test image.

Unless specifically stated otherwise, as apparent from the description, it is appreciated that throughout the specification discussions utilizing terms such as "processing," "loading," "in communication," "detecting," "calculating," "determining", "analyzing," "presenting", "retrieving" or the like, refer to the action and/or processes of a computer or computing system, or similar electronic computing device, that manipulate and/or transform data represented as physical, such as the captured and acquired image of the product inserted into the cart (or removed) into other data similarly represented as series of numerical values, such as the transformed data.

In an exemplary implementation, provided herein is a system for automated, real-time product identification in a shopping cart of a store and/or warehouse having more than a thousand stock keeping items (SKIs), comprising: a cart having a front wall, a rear wall and two side walls forming an apically open container with a base; a load cell module operably coupled to the base of the cart; a plurality of imaging modules coupled to the cart, adapted to, at least one of image an item inserted into the cart, and image an area of interest outside the cart; a central processing module in communication with the load cell and the plurality of imaging modules, the central processing module comprising a processor and being in further communication with a non-volatile memory having thereon: a classifiers' database; a product characteristics database; and a processor readable media comprising a set of executable instruction, configured, when executed to cause the processor to retrieve a set of a plurality of classifiers, wherein each set of classifiers is configured to identify a single product inserted into the cart; wherein (i) the set of executable instructions is configured, when executed, to cause the processor further to: using the imaging module, acquire an image of each inserted product; extract a predetermined number of features from the image; and identify the features extracted, wherein (ii) the set of classifiers are retrieved from the classifier database, (iii) the classifier database comprises a plurality of classifiers configured to classify at least one of: an entire warehouse, a storeroom, a shop, a grocery store, a supermarket, and a combination comprising one or more of the foregoing, wherein (iv) the features extracted by the imaging module from the inserted product is at least one of: color pallet designator, a shape designator, volumetric size, weight, a key-word, a graphic element, a scale and rotation invariant feature, and a synthesized deep feature, (v) the color pallet designator is HSV, CIE-LAB, CIE-XYZ, CIE-LCH or a color pallet designator comprising a combination of the foregoing, wherein (vi) the set of executable instructions, prior to extracting the predetermined number of features, are configured to preprocess the image of each product inserted to the cart by reducing the number of colors of the product, for example by (vii) quantizing colors using at least one of: K-means, median-cut, octree, variance-based, binary splitting, greedy orthogonal bipartitioning, optimal principal multilevel quantizer, minmax, fuzzy c-means and their combination, wherein (viii) the set of executable instructions, when executed, are configured to cause the processor to produce a color histogram of the image color palette, wherein (ix) the imaging module comprises a RGB-D camera, and wherein the set of executable instructions, when executed, are configured to cause the processor to: using the RGB-D, determine the size of the product; using the load cell module, determine the weight of the product: and combine the size and the weight to a single parameter, (x) the set of executable instructions, are further configured, when executed, to cause the processor to identify and retrieve at least one of: a logo, a watermark, a key word, a graphic symbol, and their combination, (xi) retrieving at least one of the logo, the watermark, the key word, the graphic symbol, and their combination, comprises using at least one of: a single-shot MultiBox detector (SSD) neural network, a Regional convolutional neural network. (RCNN), a Fast-RCNN, a Faster-RCNN, and a You Only Look Once (YOLO) neural network, wherein (xii) the set of executable instructions, are configured, when executed, to cause the processor to assign a retrieval key to each classifier, wherein (xiii) the set of plurality of the classifiers identifying a single product are selected by applying a nearest-neighbors algorithm and approximated nearest neighbors (ANN) algorithm to the classifiers associated with the product independently; and selecting the classifiers selected by both algorithms, wherein (xiv) all extracted features are encoded numerically, wherein (xv) the classifiers' database is formed by training the plurality of classifiers on products sharing at least two characteristics, wherein formed classifiers are associated with these set of characteristics for later retrieval, wherein (xvi) the set of executable instructions, are configured, when executed, to cause the processor to associate each of the product characteristic to a classifier or a set of classifiers, wherein (xvii) the set of executable instructions, are configured, when executed, to cause the processor to retrieve a classifier or a plurality of classifiers from the classifier database, by using each of the product characteristics or their combination as a key for retrieval, wherein (xviii) the set of executable instructions, are configured, when executed, to cause the processor to identify the color characteristic of the inserted product, through retrieving relevant classifiers by associating the color histogram of the inserted product to the classifier's-associated color-histograms by determining similarity that is based on cross histogram bin distance analysis, (xix) the cross histogram bin distance is measured using at least one of: Earth Movers Distance (EMD), and Mahalanobis Distance, wherein (xx) the set of executable instructions, are configured, when executed, to cause the processor to identify the color characteristic of the inserted product, through retrieving relevant classifiers by associating the color histogram of the inserted product to the classifier's-associated color-histograms by determining similarity that is based on bin-to-bin distance analysis, (xxi) the cross-histogram bin distance is measured using at least one of: Kullback-Leibler (KL)-Divergence, Bhattacharyya distance, and Chi-square ($X^2$) distance, wherein (xxii) the set of executable instructions, are configured, when executed, to cause the processor to train products' recognition and/or identification algorithm, by grouping products sharing at least one characteristics, wherein (xxiii) the non-volatile memory further comprises a product image database, configured to store images captured by the imaging module, wherein (xxiv) the set of executable instructions, are configured, when executed, to cause the processor to associate and/or retrieve the classifier based on product's packaging shape or shape descriptor, wherein the shape or shape-descriptor is identified as the key-word on the package, (xxv) the retrieved, key-word based classifier is semantically related to the inserted product characteristic, wherein (xxvi) the set of executable instructions, are configured, when executed, to cause the processor to associate and/or retrieve the classifier by matching representative key-words of the inserted products, to key-words associated to the classifiers in the classifiers database, wherein (xxvii) the set of executable instructions, are configured, when executed, to cause the processor to associate and/or retrieve the classifier, the classifier's associated descriptors in the classifier database is matched to the inserted product descriptors, by applying ORB, BRIEF descriptors, wherein (xxviii) the cart further comprises a transceiver in communication with the central processing module, the transceiver adapted to transmit and receive a signal configured to provide location of the cart, (xxix) the signal is an ultra-wideband radio pulse, (xxx) the classifiers retrieved are dependent on the cart's location, wherein (xxxi) the deep feature is synthesized from at least one of: a predetermined CNN, and a plurality of the product characteristics, and wherein (xxxii) the plurality of product characteristics further comprises the product location within at least one of: the store, and the warehouse.

While the invention has been described in detail and with reference to specific exemplary implementations thereof, it will be apparent to one of ordinary skill in the art that various changes and modifications can be made therein without departing from the spirit and scope thereof. Accordingly, it is intended that the present disclosure covers the modifications and variations of this invention provided they come within the scope of the appended claims and their equivalents.

What is claimed:

1. A system for automated classification of a product in a shopping cart, the system comprising:
   a. a cart having a front wall, a rear wall and two side walls forming an apically open container with a base;
   b. a plurality of imaging modules coupled to the cart, adapted to image at least one of: an item inserted into the cart, and an area of interest outside the cart; and
   c. a central processing module in communication with the plurality of imaging modules, the central processing module comprising a processor and being in further communication with a non-volatile memory having thereon: a classifiers' database; a product characteristics database; and a processor-readable media comprising a set of executable instruction, configured, when executed to cause the processor to retrieve a set of a plurality of classifiers from the classifier database, wherein each set of classifiers retrieved is configured to identify a single product inserted into the cart, the set of executable instructions is configured, when executed, to cause the processor further to:
      i. using the imaging module, capture an image of each inserted product;
      ii. preprocess the image of each product inserted to the cart by reducing the number of colors of the product;
      iii. extract a predetermined number of features from the image with reduced colors;
      iv. identify the features extracted; and
      v. using the features extracted as a key, extract a set of relevant classifiers configured to produce a single product recognition.

2. The system of claim 1, wherein the features extracted by the imaging module from the inserted product is at least one of: color pallet designator, a shape designator, volumetric size, weight, a key-word, a graphic element, a scale and rotation invariant feature, and a deep feature synthesized from at least one of: a predetermined CNN, and a plurality of the product characteristics.

3. The system of claim 2, wherein in reducing the number of colors of the product, the set of executable instructions, are configured, when executed, to cause the processor to reduce the number of colors by quantizing colors using at least one of: K-means, median-cut, octree, variance-based, binary splitting, greedy orthogonal bipartitioning, optimal principal multilevel quantizer, minmax, fuzzy c-means and their combination.

4. The system of claim 3, wherein the set of executable instructions, when executed, are configured to cause the processor to:
   a. produce a color histogram of the image color palette; and
   b. identify the color characteristic of the inserted product, through retrieving relevant classifiers by associating the color histogram of the inserted product to the classifiers'-associated color-histograms by determining similarity that is based on cross histogram bin distance analysis.

5. The system of claim 4, wherein the cross-histogram bin distance is measured using at least one of:
   Kullback-Leibler (KL)-Divergence, Bhattacharyya distance, and Chi-square ($x^2$) distance.

6. The system of claim 2, wherein the imaging module comprises a RGB-D camera, and wherein the set of executable instructions, when executed, are further configured to cause the processor to:

a. using the RGB-D, determine the size of the product;
b. using a load cell module included with the system, determine the weight of the product; and
c. combine the size and the weight to form a deep feature.

7. The system of claim 2, wherein, in extracting the features from the image with reduced colors the set of executable instructions, are further configured, when executed, to cause the processor to extract at least one of: a logo, a watermark, a key word, and a graphic symbol, using at least one of: a single-shot MultiBox detector (SSD) neural network, a Regional convolutional neural network, (RCNN), a Fast-RCNN, a Faster-RCNN, and a You Only Look Once (YOLO) neural network.

8. The system of claim 1, wherein the set of relevant classifiers configured to produce a single product recognition are selected by applying a nearest-neighbors algorithm and approximated nearest neighbors (ANN) algorithm to the classifiers associated with the product independently; and selecting the classifiers selected by both algorithms.

9. The system of claim 1, wherein the classifiers in the classifiers' database are each formed by training the system on products sharing at least one characteristic, the formed classifiers are each associated with these at least one characteristic for later retrieval.

10. The system of claim 9, wherein the set of executable instructions, are configured, when executed, to cause the processor to associate each of the product characteristic in the characteristic database to a classifier or a set of classifiers in the classifier database.

11. The system of claim 1, wherein the set of executable instructions, are further configured, when executed, to cause the processor to associate and/or retrieve the classifier based on:
a. product's packaging shape or shape descriptor, wherein the shape or shape-descriptor is identified as the keyword on the package that is semantically related to the inserted product characteristic;
b. matching representative key-words of the inserted products, to key-words associated to the classifiers in the classifiers database; and
c. matching the classifiers-associated descriptors in the classifier database to the inserted product descriptors by applying local image descriptors-matching algorithm.

* * * * *